US008676911B1

(12) United States Patent
Parkinson

(10) Patent No.: US 8,676,911 B1
(45) Date of Patent: *Mar. 18, 2014

(54) SYSTEMS AND METHODS FOR TIMESHIFTING MESSAGES

(71) Applicant: Google Inc., Mountain View, CA (US)

(72) Inventor: Ian Parkinson, London (GB)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/679,697

(22) Filed: Nov. 16, 2012

Related U.S. Application Data

(63) Continuation of application No. 13/271,916, filed on Oct. 12, 2011, now Pat. No. 8,335,833.

(51) Int. Cl.
*G06F 15/16* (2006.01)

(52) U.S. Cl.
USPC ........... 709/206; 709/203; 709/219; 705/319; 715/203

(58) Field of Classification Search
CPC ..... H04L 41/5093; H04L 51/32; G06Q 50/01
USPC .................. 709/203, 206, 217, 219; 705/319; 715/203
See application file for complete search history.

(56) References Cited

U.S. PATENT DOCUMENTS

| | | | | |
|---|---|---|---|---|
| 6,480,885 | B1 * | 11/2002 | Olivier | 709/207 |
| 7,707,246 | B1 | 4/2010 | Issa et al. | |
| 8,335,833 | B1 * | 12/2012 | Parkinson | 709/206 |
| 2003/0182371 | A1 * | 9/2003 | Worthen | 709/204 |
| 2005/0060741 | A1 * | 3/2005 | Tsutsui et al. | 725/32 |
| 2005/0240428 | A1 * | 10/2005 | Gabrick et al. | 705/1 |
| 2006/0064486 | A1 * | 3/2006 | Baron et al. | 709/224 |
| 2009/0103693 | A1 | 4/2009 | Katis et al. | |
| 2009/0157537 | A1 | 6/2009 | Miller | |
| 2009/0164484 | A1 * | 6/2009 | Horowitz et al. | 707/100 |
| 2009/0293079 | A1 | 11/2009 | McKee et al. | |

(Continued)

OTHER PUBLICATIONS

Weisz, Justin D., "Collaborative online video watching", Carnegie Mellon University, ProQuest, UMI Disertations Publishing, 2009.*

(Continued)

*Primary Examiner* — Oanh Duong
(74) *Attorney, Agent, or Firm* — Foley and Lardner LLP; John D. Lanza

(57) ABSTRACT

Systems, methods, and computer-readable media that may be used to present messages posted on messaging networks to a user in a time-shifted manner are provided. One method includes transmitting a request to a server to provide messages posted by users of one or more messaging services. Each of the messages has a timestamp associated therewith that falls within a time range associated with the request. The timestamp is based on a time at which the message was originally posted. The method further includes receiving the messages from the server. The method further includes correlating, for each of the messages, the time at which the message was originally posted with a time in the time range associated with the request. The times are correlated based on the timestamp of the respective message. The method further includes transmitting, to one or more display devices, display data representing the messages. Display of each of the messages is shifted based on the correlation such that the messages are displayed in substantially the same manner as if the messages had been viewed live during the time range associated with the request when they were posted.

24 Claims, 8 Drawing Sheets

(56) References Cited

U.S. PATENT DOCUMENTS

| | | |
|---|---|---|
| 2009/0327422 A1 | 12/2009 | Katis et al. |
| 2010/0138298 A1* | 6/2010 | Fitzgerald et al. ......... 705/14.53 |
| 2010/0274866 A1* | 10/2010 | Hammad et al. ............. 709/207 |
| 2010/0293575 A1 | 11/2010 | Biniak |
| 2011/0173214 A1* | 7/2011 | Karim ........................... 707/754 |
| 2012/0072507 A1* | 3/2012 | Chen et al. .................... 709/206 |
| 2012/0131475 A1* | 5/2012 | Bhogal et al. ................. 715/753 |

OTHER PUBLICATIONS

PCT International Search Report and Written Opinion of PCT/US2012/059783 dated Jan. 31, 2013, 16 pages.

* cited by examiner

700 → 705

Timeframe for Posted Messages: ☐ During this show  ☐ During this timerange:
Start: [5:00 pm]  End: [5:30 pm]

710 — Active Messaging Services/Networks:

☐ Google+  ☐ LinkedIn  ☐ Orkut
☐ Facebook  ☐ MySpace  ☐ Bebo
☐ Twitter  ☐ Buzz  ☐ Other [▽]

715 — Import Contacts From Network: [Google+ ▽] [Go!]  ☐ User1  ☐ User2  ☐ User3 ⋮

720 — Manage Networks/Logins: [Network Setup]

725 — Parameters For Messages:

730 — Limit to these networks:  735 Limit to these users:  740 Keyword Limits:

☐ Google+  ☐ User1 (Google+)  745 ☐ Posts related to current media program (based on predefined key terms)
☐ Facebook  ☐ User2 (F'book)
☐ Twitter  ☐ User3 (Google+)  750 ☐ Posts with the following terms:
☐ LinkedIn  ☐ User4 (LinkedIn)
☐ MySpace  ☐ User5 (Google+)

[          ] [ADD]
☐ Term1
☐ Term2
☐ Term3

Message Suppression: [Start Message Suppression Wizard] — 755

FIG. 7

SYSTEMS AND METHODS FOR TIMESHIFTING MESSAGES

CROSS REFERENCE TO RELATED APPLICATIONS

The present application is a continuation of U.S. Ser. No. 13/271,916, filed Oct. 12, 2011, titled "Systems and Methods for Timeshifting Messages," which is hereby incorporated herein in its entirety.

BACKGROUND

The present disclosure relates generally to the fields of media viewing systems and messaging systems. More specifically, various illustrative implementations of the present disclosure relate to systems for timeshifting media programs and messages posted on messaging services so that they may be viewed at a later time than they were broadcast and posted.

It is common for users to watch media programs such as television shows at a later time than their original airing, for example by using a digital video recorder (DVR) or streaming video from a website. Some users also like to view messages posted on messaging services, such as social media networks, that may relate to a media program they are viewing. However, it may be difficult for a user to locate or determine the messages they wish to view, such as messages relating to a particular media program, when the user views the media program after the time of its airing.

SUMMARY

One implementation of the disclosure relates to a method comprising transmitting a request to a server to provide messages posted by users of one or more messaging services. Each of the messages has a timestamp associated therewith that falls within a time range associated with the request. The timestamp is based on a time at which the message was originally posted. The method further comprises receiving the messages from the server. The method further comprises correlating, for each of the messages, the time at which the message was originally posted with a time in the time range associated with the request. The times are correlated based on the timestamp of the respective message. The method further comprises transmitting, to one or more display devices, display data representing the messages. Display of each of the messages is shifted based on the correlation such that the messages are displayed in substantially the same manner as if the messages had been viewed live during the time range associated with the request when they were posted.

Another implementation of the disclosure relates to an apparatus comprising a computing device operably coupled to a memory and configured to transmit a request to a server to provide messages posted by users of one or more messaging services. Each of the messages has a timestamp associated therewith that falls within a time range associated with the request. The timestamp is based on a time at which the message was originally posted. At least a portion of the time range associated with the request falls in a time period during which a media program was broadcast. The computing device is further configured to receive the messages and correlation data for each message from the server, wherein the correlation data for each message represents a time relationship, based on the timestamp of the respective message, between the time at which the message was originally posted and a time in the time period during which the media program was broadcast. The computing device is further configured to generate display data representing the media program and the messages, wherein the display data is based on the correlation data. The computing device is further configured to transmit, to one or more display devices, the display data. For each of the messages, responsive to receiving the display data, the one or more display devices are configured to display the message during playback of the media program at a time position within a playback time range of the media program that is based on the time relationship between the time at which the message was originally posted and the time in the time period during which the media program was broadcast.

Yet another implementation of the disclosure relates to a computer-readable medium having instructions stored thereon that, when executed by a processor, cause the processor to perform operations comprising transmitting a request to a server to provide messages posted by users of one or more messaging services. The request comprises a plurality of parameters including at least one of a time range or an identification of a media program associated with the request. At least a portion of the time range associated with the request falls in a time period during which the media program was broadcast. The operations further comprise receiving the messages from the server. Each of the messages has a timestamp associated therewith that falls within the time range associated with the request. The timestamp is based on a time at which the message was originally posted. The operations further comprise correlating, for each of the messages, the time at which the message was originally posted with a time in the time period during which the media program was broadcast. The times are correlated based on the timestamp of the respective message. The operations further comprise transmitting, to one or more display devices, display data representing the media program and the messages. The media program and the messages are shifted by approximately the same amount of time from a broadcast time of the media program and times at which the messages were originally posted, respectively, such that the messages are displayed in substantially the same manner as if the media program and messages had been viewed live when they were broadcast and posted.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 7 is an example display image that may be used to set various message parameters according to an illustrative implementation.

DETAILED DESCRIPTION

Figure 1:
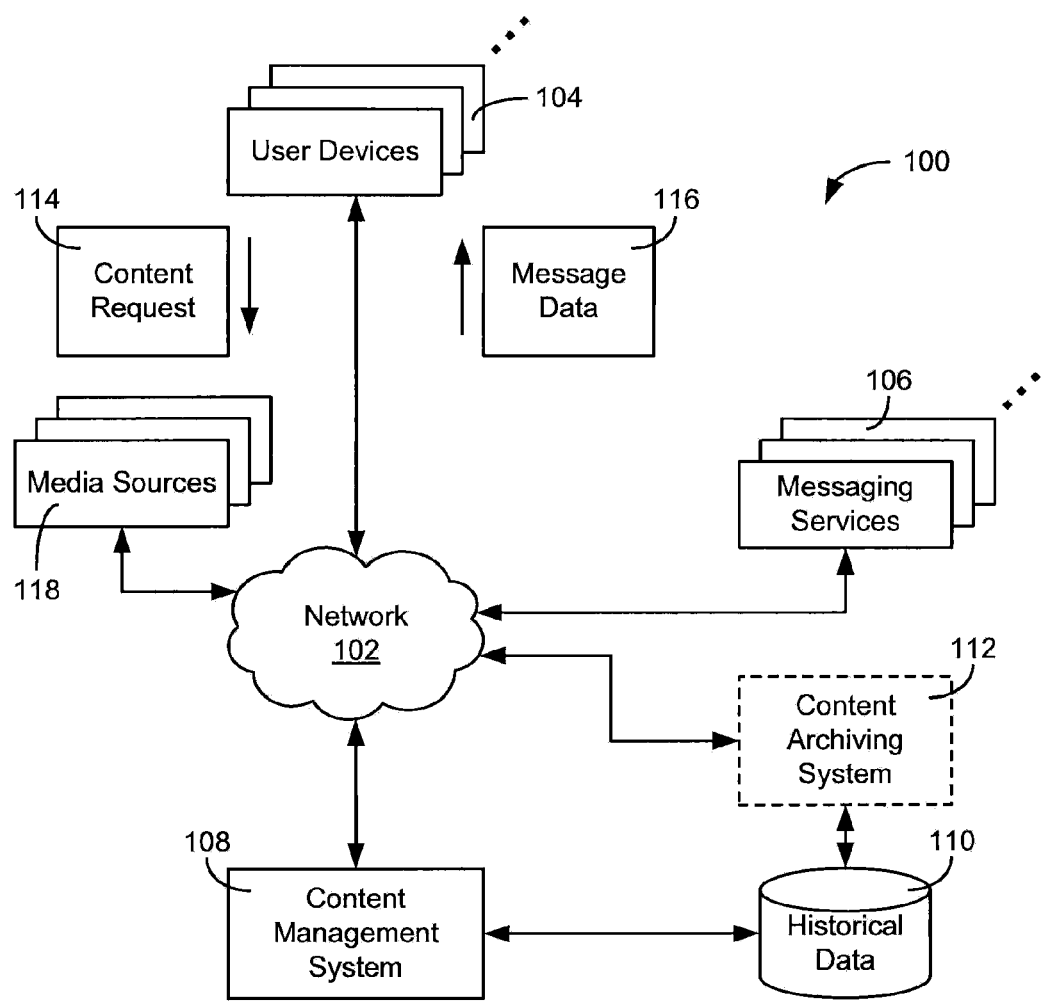
FIG. 1 is a block diagram of an example environment in which one or more user devices interact with a server system to provide messages that are correlated with a timeshifted media program according to an illustrative implementation.

Referring generally to the Figures, various illustrative systems and methods are provided that may be used to provide messages to a user in a timeshifted fashion such that they are correlated with a media program such as a television show or movie that is played back at a time after it has been broadcasted. Media program timeshifting, such as by digital video recorder (DVR), streaming video off of a website or through a video streaming service, downloading content through a media download service or store (e.g., Android app store), etc. allows users flexibility in deciding when to view broadcasted programs and enables users to view their favorite programming without having to rearrange their schedules to view the programming at the time at which it is broadcasted. DVRs provide a storage system on which users can record programming that is received, for example, through a cable or satellite signal. Streaming content that is provided through the internet may be accessible to users without the user having to predetermine that the user wishes for the content to be saved for later viewing. Content that has previously been broadcast or distributed may be available on media download services and may be downloaded for later viewing (e.g., online or offline) and/or streamed (e.g., while the media is still downloading).

Some users enjoy using messaging services, such as social media networks, to interact with other users who may be watching the same programming as it is being broadcasted. For example, a user may watch a reality television show and post thoughts on the show and/or its cast on one or more social media networks, such as Google+. The user may also view posts made by friends or acquaintances on social media networks around the time that the programming is broadcasted that may pertain to the program. In this manner, the user and contacts of the user through messaging services may achieve an on-line conversation or dialog based on the media programming.

Although a user may wish to view programming in a timeshifted fashion after the program has been broadcasted, the user may still be interested in viewing comments that his contacts may have made on messaging services relating to the programming. This can be difficult, however, because the user must manually determine the timeframe in which the programming was broadcasted, then manually look up the messages posted around that timeframe on various messaging services and of various other users of those services that the user is interested in viewing. For some messaging services, it may not be possible for the user to manually identify messages during the broadcasting timeframe as the services may not provide detailed time information for the posting of the various messages in a publicly accessible format. Additionally, if the user locates relevant messages and views them before the user has completed viewing the media programming, some messages may give away or spoil plot points for the user before the user sees the relevant portions of the programming.

Various illustrative systems and methods provided herein gather messages that the user may wish to see from one or more messaging services and provide them in a time-correlated format with the media programming. The messages may be archived in a historical database and/or may be retrieved from databases of the messaging services. Each of the messages may have a timestamp indicating a time at which the message was originally posted on the messaging service. Using the timestamp, various illustrative implementations may correlate the broadcast time of the media program with the posting time of each of the messages. Based on the correlation, the media program and messages may be displayed on one or more displays in a manner such that the messages are displayed at the time within the playback timeframe of the media programming at which they would have appeared if the user were viewing the media program and messages live when they were broadcast and posted.

Referring to FIG. 1, a block diagram of an example environment 100 in which one or more user devices 104 interact with a server system (e.g., content management system 108) to provide messages that are correlated with a timeshifted media program is shown according to an illustrative implementation. One or more user devices 104 may be used by a user to view media programming (e.g., television shows, movies, etc.). The media programming may be broadcast over any medium or service type (e.g., cable, satellite, Internet, etc.), any distribution type (e.g., freely available, available on a pay-per-view basis, available via subscription, etc.), may be broadcast once or multiple times, etc. User devices 104 may also be used to view messages and other content posted on one or more messaging services or social media networks (e.g., Google+, Facebook, Twitter, LinkedIn, MySpace, Buzz, Orkut, Bebo, etc.). In various illustrative implementations, the media programming and messages may be viewed on the same user device 104 or on different user devices 104. User device 104 may be any type of computing device (e.g., having a processor and memory or other type of computer-readable medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more user devices 104 may be set-top boxes or other devices for use with a television set, such as a Google TV device. In some implementations, content may be provided via a web-based application. In some implementations, user devices 104 may be designed to use various types of software and/or operating systems, such as the Google Android operating system. In various illustrative implementations, user devices 104 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.).

User devices 104 may be configured to receive data and/or programming from various sources using a network 102. In some implementations, network 102 may comprise a computing network (e.g., LAN, WAN, Internet, etc.) to which user devices 104 may be connected via any type of network connection (e.g., wired, such as Ethernet, phone line, power line, etc., or wireless, such as WiFi, WiMAX, 3G, 4G, satellite, etc.). In some implementations, network 102 may additionally or alternatively comprise a media distribution network, such as cable (e.g., coaxial metal cable), satellite, fiber optic, etc., configured to distribute media programming and/or data content.

User devices 104 may be configured to receive programming from one or more media sources 118. Media sources 118 may include media programming service providers such as cable, satellite, fiber optic, etc. service providers. Media sources 118 may additionally or alternatively include streaming media service providers and/or server devices configured to provide streaming video or other media using, for example, a data connection. In various implementations, media sources 118 may be configured to distribute programming in a live broadcast fashion (e.g., television programming broadcast on a television channel or broadcast live over the Internet) and/or in an on-demand or timeshifted fashion (e.g., some programming distributed using streaming video over the Internet).

In various illustrative implementations, user devices 104 are configured to provide media programming to a user in a timeshifted fashion. In some implementations, user devices 104 may have digital video recorder (DVR) or similar recording capabilities in which user devices 104 may receive content and store the content in a computer-readable medium (e.g., a memory) for later viewing. In some implementations, user devices 104 may additionally or alternatively be configured to receive timeshifted or on-demand media programming, for example, over the Internet using a data connection to network 102. The timeshifting functionality of user devices 104 allows a user to view media programming at a time after the programming is broadcast or distributed.

User devices 104 may also be used to view messages and other content posted on one or more messaging services 106. Messaging services 108 may include any type of messaging services, such as social media networks (e.g., Google+, Facebook, Twitter, LinkedIn, MySpace, Buzz, Orkut, Bebo, etc.). Messaging services 106 may allow various users to post various types of messages (e.g., textual, picture, video, links to web addresses and/or media posted on the Internet, etc.). Users may be identified on messaging services 106 by legal name and/or by a username (e.g., unique from other users of the respective messaging service 106) or other user identifier such as a profile photograph. In some implementations, all messages posted on a messaging service 106 may be publicly accessible. In other implementations, some or all of the messages posted on a messaging service 106 may be limited in their publicity or distribution (e.g., private, semi-private), such that only particular types of groups (e.g., friends, coworkers, acquaintances, schoolmates, etc.), particular identified users, etc. can access particular messages or groups of messages. In some implementations, users may provide credentials (e.g., a username or email address and a password) via user device 104 used to authenticate the user and provide user device 104 with access to content (e.g., messages) that may not be publicly accessible but may be accessible by the user.

User devices 104 may be configured to communicate with a content management system 108 to retrieve messages that were posted on messaging services 106 and provide them to a user in a time-correlated fashion with timeshifted media programming. Content management system 108 may be configured to retrieve messages posted on messaging services 106 based on one or more parameters used to determine the desired messages. In some illustrative implementations, content management system 108 may include a server computing device configured to retrieve messages posted using two or more messaging services 106. In some illustrative implementations, content management system 108 may include multiple server computing devices, each configured to retrieve messages posted on a single messaging service 106. Content management system 108 may be configured to retrieve messages from databases maintained by messaging services 106 (e.g., using network 102 and/or another network).

Content management system 108 may additionally or alternatively be configured to retrieve archived message data from a historical database 110 configured to store messages posted on one or more messaging services 106. In some implementations, content management system 108 may be configured to retrieve (e.g., periodically, on occurrence of a particular event, on demand from a user or administrator, etc.) message data from messaging services 106 (e.g., via network 102 and/or another network) and store the message data in database 110 for later retrieval. In some implementations, message data may be collected by a separate content archiving system 112 and stored in database 110. In such an illustrative implementation, content management system 108 may retrieve message data from database 110 through a direct data connection and/or through network 102 (e.g., via communication with content archiving system 112).

User devices 104 may be configured to retrieve message data from content management system 108 through the use of content requests 114. In some illustrative implementations, content requests 114 may be batch requests of messaging content. Content requests 114 may include information that can be used by content management system 108 to determine the message or messages that should be retrieved and sent to user devices 104. Content requests 114 may include data representing a desired timeframe for the messages. In some implementations, each message may have an associated timestamp or other type of time data indicating a date and time at which the message was posted on the relevant messaging service 106. Content management system 108 may be configured to retrieve appropriate messages based on the timeframe in a content request 114 and the timestamps of the messages. In some illustrative implementations, the timeframe may be represented in a content request 114 by an actual range of times (e.g., start time and end time, start time and duration, end time and duration, etc.). The range of times provided in content request 114 may coincide with the broadcast time(s) of one or more media programs that the user intends to view in a timeshifted manner.

In some illustrative implementations, the timeframe may additionally or alternatively be represented in a content request 114 by an identification of one or more media programs associated with the request. In some implementations, user devices 104 may be configured to receive an identification of a media program, determine an actual timeframe associated with the media program (e.g., using an electronic program guide configured to identify times and/or sources/channels at which media programming is provided), and provide the timeframe data in the content request 114 to content management system 108. In other implementations, user devices 104 may be configured to provide the identification of the media program in the content request 114 to content management system 108, and content management system 108 may be configured to determine an appropriate timeframe for desired messages based on the identified media program (e.g., using an electronic program guide).

In various illustrative implementations, content requests 114 may include various other parameters for determining desired messages. In some implementations, a content request 114 may include an identification of the messaging services 106 on which the desired messages were posted. For example, a user may indicate (e.g., using a user input device associated with a user device 104) that the desired messages are messages posted on Google+ and Twitter, but not those posted on other messaging services 106 such as Facebook or LinkedIn. In some implementations, a content request 114 may include an identification of one or more users of messaging services 106 from whom the messages originated. The identification of the users may be by legal name of the users and/or usernames (e.g., for each messaging service 106) of the users. In some illustrative implementations, co-users (e.g., friends, contacts, etc.) may be identified (e.g., automatically) by user devices 104 and/or content management system 108 based on the identity of the user (e.g., on messaging services 106). For example, the user may be given an option to retrieve messages from all contacts on a particular messaging service 106, and the user's authentication information (e.g., username and password) may be used to retrieve a list of contacts of the user on the messaging service 106. Messages may then be retrieved that were posted within the desired timeframe associated with content request 114 and were posted by co-users that are in the list of the user's contacts on the messaging service 106. In some illustrative implementations, the user may be provided with an interface in which they can retrieve a list of some or all of the user's contacts on one or more messaging services 106 and can select from the list the contacts that the user wishes to be included in the request (e.g., by checking and/or unchecking checkboxes next to the names of the contacts).

In some illustrative implementations, content requests 114 may include search parameters configured to be used by content management system 108 to determine appropriate messages based upon the content of the messages. For example, a content request 114 may include one or more search terms, keywords, hashtags, and/or other content identifiers that may be used to determine appropriate messages. Content management system 108 may be configured to limit the identified messages to those containing the search terms. In some implementations, content management system 108 may be configured to apply an equivalence engine and/or other type of search engine to the search terms to identify messages. Such an engine may be configured to identify messages that do not contain the exact terms provided in the content request 114 but contain equivalent, similar, related, relevant, etc. terms to those provided in the content request 114.

In some illustrative implementations, user devices 104 and/or content management system 108 may be configured to determine appropriate search terms based on the identified media programming. For example, user devices 104 and/or content management system 108 may be configured to determine search terms that are associated with the content of the media programming, such as terms from the title of the program, names of characters or cast members on the program, terms based on the subject matter of the program (e.g., "food, restaurant, kitchen, entrée, chef, etc." for a cooking program), etc. In some implementations, the search terms may be determined at least in part based on information relating to the identified media program that is provided in an electronic program guide or other electronic information source relating to the media program.

In some illustrative implementations, the user may indicate that he wishes to receive message content associated with the media program, such as messages posted by the producers, cast, media commentators, and/or other commercial entities or individuals associated with the media program. For example, the programming entities may publish backstage gossip or judge's opinions on a reality TV contest using one or more messaging services. TV critics may also post messages on the messaging services. Such content may also be retrieved and provided to the user using user devices 104 and/or content management system 108.

Content management system 108 is configured to retrieve messages based on data and/or parameters provided in the content requests 114 and provide the resulting messages to user devices 104 as message data 116. In some implementations, content management system 108 may be configured to correlate the posting times of the retrieved messages to times within the timeframe provided in a content request 114. For example, a timeframe associated with a content request 114 may correspond to the broadcast time of a media program and may be 9 PM to 10 PM on 9/10/11, and three retrieved messages M1, M2, and M3 may have posting times (e.g., as indicated by associated timestamps) on 9/10/11 of 9:05:02 PM, 9:22:15 PM, and 9:47:44 PM, respectively. Content management system 108 may be configured to determine that, within the 60 minute broadcast timeframe of the media program, message M1 was posted at the second second after the fifth minute, message M2 was posted at the 15th second after the 22nd minute, and message M3 was posted at the 44th second after the 47th minute. Content management system 108 may be configured to provide this correlation data as part of message data 116 to be used by the user device 104 in providing the messages in a time-correlated manner during timeshifted playback of the media program. In some illustrative implementations, content management system 108 may provide message data 116 to the user device 104 without correlation data, and the user device 104 may be configured to perform the correlation procedure.

User device 104 may be configured to generate display data to be transmitted to one or more display devices based on the correlation data. After the display data is received, the display device(s) may be configured to display the media program and the messages represented by message data 116 in a time-correlated fashion. The media program may be played back, and the messages may be displayed at appropriate times within the playback of the media program according to the correlation data. For instance, in the example noted in the paragraph above, the media program that was broadcasted from 9 PM to 10 PM on 9/10/11 may be played back. Once the five minute, two second mark of the playback time range is met, message M1 may be displayed. Similarly, once the playback time reaches the 22 minute, 15 second mark, message M2 may be displayed, and once the playback time reaches the 47 minute, 44 second mark, message M3 may be displayed. In this way, messages may be displayed in a similar manner as they would be viewed if the messaging services 106 were being monitored while watching the media program live as it was being broadcasted.

In some illustrative implementations, the media program may be controlled by a separate device than that which displays the messages. For example, the media program may be displayed on a television, and the messages may be displayed on a separate computing device. In some such implementations, the messages displayed on the separate computing device may be synchronized to correspond with the media program being displayed on the television. In some illustrative implementations, the synchronization may be performed manually by a user (e.g., using manual time range controls). In other illustrative implementations, the synchronization may additionally or alternatively be performed automatically (e.g., using metadata and/or other data that may be used to correlate the timeframe of the media program to the posting times of the messages).

In some illustrative implementations, a user may be enabled to control playback of the media program using an input device (e.g., a remote control). For example, the user may be provided with play, pause, rewind, fast-forward, skip ahead, skip back, slow motion, and/or other types of commands or functions that can be used to control playback of the media program. In some implementations, user devices 104 may be configured to control the timing at which messages are displayed based on the playback command in addition to controlling playback of the media program. For instance, if a fast-forward command is received at the beginning of playback of the media program in the example provided above, the five minute mark in the playback time range will be reached before five minutes of actual time has elapsed. Message M1 may be displayed as soon as the five minute mark in the playback time range is reached under the faster playback speed. In another instance, a skip ahead command may be received when playback is at the two minute mark indicating that the user wishes to skip ahead to the seven minute mark. In this instance, in one illustrative implementation, message M1 may be immediately displayed after the skip ahead command is executed. In another instance, a rewind command may be received when playback is at the six minute mark and may continue until playback is at the four minute mark in the playback time range. In this instance, in some illustrative implementations, message M1 may be removed from the display image once playback rewinds past (e.g., behind) the five minute mark in the playback time range). In other illustrative implementations, messages may be retained on the display once they have already been displayed even if the playback is rewound or skipped to a point in the playback time range that is prior to the point corresponding to when the message was originally posted. In some illustrative implementations, display of messages may be tied directly to a playback timeline of the media program, such that the messages will always be displayed at a specific time within the playback timeline (e.g., the thirty minute mark) regardless of whether playback is sped up, slowed down, paused, etc. For example, in some illustrative implementations, if playback is sped up and the specific time in the timeline is reached more quickly than under normal playback, then the message will also be displayed more quickly (e.g., as soon as the specific time in the timeline is reached).

In some illustrative implementations, multiple user devices 104 and/or displays may be used to display the media programming and message data. For example, the media programming may be displayed on a first display device (e.g., a television), and the messages may be displayed on a second display device (e.g., a tablet or smartphone). In some illustrative implementations, playback commands provided by a user on one user device 104 (e.g., a tablet or smartphone) may be used to change the timing of media programs and/or messages displayed on a display associated with a second user device 104 (e.g., a set top box or television). For example, in one illustrative implementation, social media messages or feeds may be displayed on a tablet device while a television show is played back from a DVR device connected to a television set. A user may execute a pause command on the tablet device, and the pause command may cause the display of messages on the tablet device to pause and the display of the television show to pause on the television set. In some illustrative implementations, the two user devices 104 may communicate directly with one another (e.g., through network 102 and/or a different network, such as a LAN, via WiFi or Bluetooth, etc.). In other illustrative implementations, commands may be relayed from one user device 104 to another user device 104 using content management system 108 or another type of server computing device.

In some illustrative implementations, the messages may not be correlated to a media program being displayed but rather may be correlated to a particular timeframe that may not necessarily correspond to a media program. For example, a user may wish to view messages that were posted around the time of a significant news event, messages that were posted by contacts or friends who attended a particular social event, etc. In some illustrative implementations, the user may manually specify a timeframe for the desired messages that the user wishes to view, as described in further detail elsewhere in the present disclosure. In some illustrative implementations, the user may additionally or alternatively identify a particular event that may be used to determine the desired timeframe (e.g., automatically). For instance, in the example in which the user wishes to view messages posted by friends who attended a social event, the user may identify the social event (e.g., by name), and the user device 104 and/or content management system 108 may be configured to determine a timeframe associated with the social event (e.g., using information available for searching, such as information available via the internet, regarding the date and time of the event).

Figure 2:
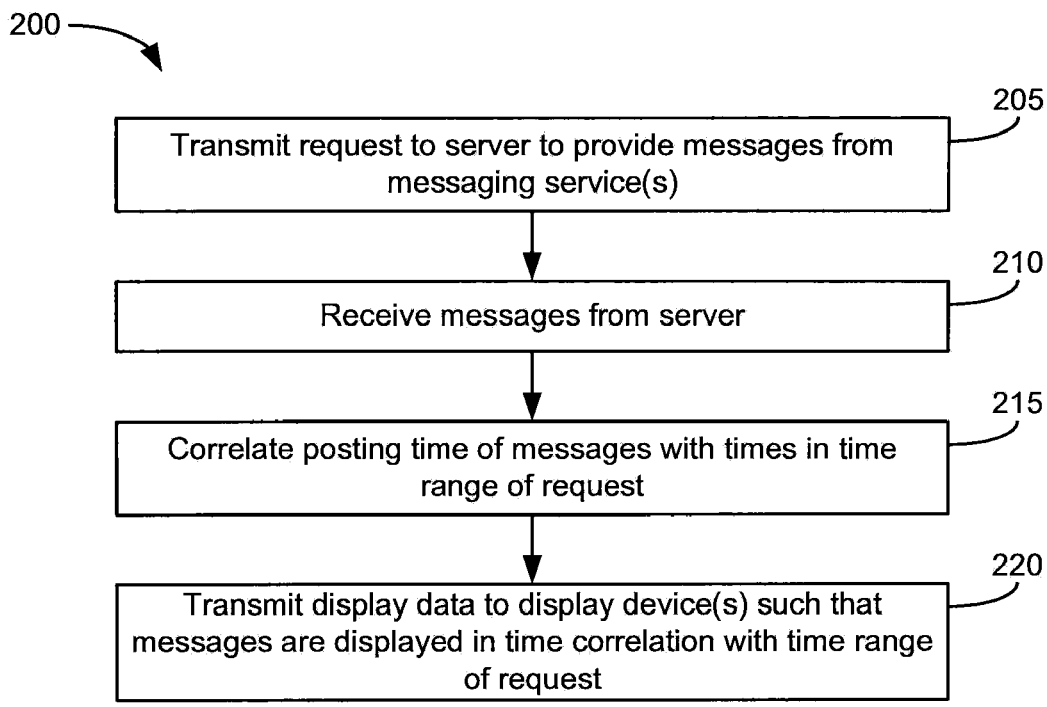
FIG. 2 is a flow diagram of a process for providing messages that are correlated with a timeshifted media program according to an illustrative implementation.

Referring now to FIG. 2, a flow diagram of a process 200 for providing messages that are correlated with a timeshifted media program is shown according to an illustrative implementation. In some illustrative implementations, process 200 may be carried out or executed using one or more user or client devices (e.g., user devices 400).

A user device may be used to transmit a request to a server system (e.g., content management system 108) to provide messages that have been posted by users on one or more messaging services (205). In some illustrative implementations, the request may include data representing a desired timeframe for the messages to be retrieved and/or an identification of a media program associated with a request. For example, the request may include a time range of 5/23/11 from 8 PM PST to 8:30 PM PST. In another example, the request may include an identification of a particular media program, such as an episode of a fictional television show titled "The Greatest TV Show In History" that aired on 6/3/11 from 5 PM PST to 6 PM PST. In various illustrative implementations, the request may additionally or alternatively include various other parameters, such as an identification of desired messaging services, users, search terms, etc. In some illustrative implementations, one or more of the parameters may be provided by the user.

The server may be configured to retrieve the messages and generate messaging data to be received at the user device (210). The message data received from the server may include a timestamp for each of the messages representing a time at which the messages were originally posted. The user device may be configured to correlate a posting time of each of the messages with a time within the time range associated with the request (e.g., a broadcast time range of a media program) (215). The correlation may be performed based on the times at which the messages were originally posted on the messaging service(s) (e.g., as embodied in the timestamps of the messages) as compared to the time range of the request (e.g., the time range in which the media program was broadcasted). In some implementations, one or more of the messages (e.g., less than all of the messages that are received from the server) may be correlated and/or presented on display images.

The user device may be configured to generate display data based on the message data and correlation data and transmit the display data to one or more display devices (220). In illustrative implementations in which the messages are correlated to a media program, display images may be presented on the display device(s) that provide the media program and messages in a time-correlated manner, such that the messages are displayed at a time position within the playback timeframe of the media program that is approximately the same relative time position as when the messages would have been seen if viewed as they were originally posted while watching the media program live as it was broadcasted. For example, a time from the start of playback of the media program until a message is displayed (e.g., assuming no playback commands are executed by a user) may be substantially the same as a time from the start time of the broadcast of the program until the message was originally posted on its respective messaging service. By providing messages in time correlation with a media program as it is played back in a timeshifted fashion (e.g., timeshifting the messages in the same manner and/or by the same amount of time as the media program), a user can more easily observe the commentary and opinions of his contacts on various messaging services and, in some instances, correlate the comments with events that occurred in the media program. Additionally, because the messages are not displayed before the corresponding time in the media program, the risk that a user may be subjected to remarks that may spoil certain parts of the program (e.g., who has been removed from a reality TV competition, what character gets married in a drama, etc.) before the relevant parts of the program have been viewed may be reduced.

Figure 3:
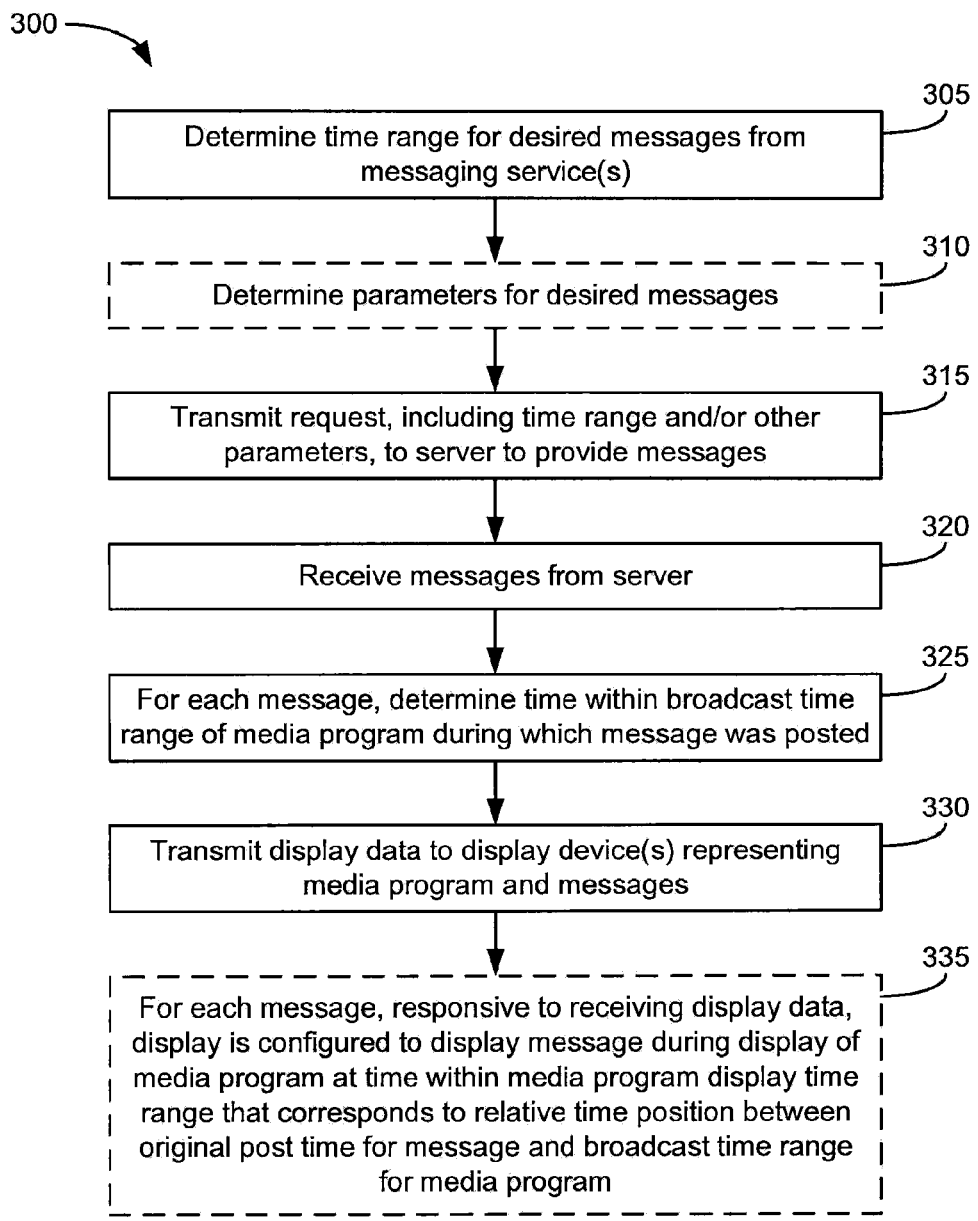
FIG. 3 is a more detailed flow diagram of a process for providing messages that are correlated with a timeshifted media program according to an illustrative implementation.

Referring now to FIG. 3, a more detailed flow diagram of a process 300 for providing messages that are correlated with a timeshifted media program is shown according to an illustrative implementation. In some illustrative implementations, various steps of process 300 may be carried out or executed using one or more user or client devices (e.g., user devices 400).

A user device may be configured to determine a time range for messages that have been posted to one or more messaging services and are to be retrieved by a server system (305). In various illustrative implementations, the time range for the messages may be determined based on user input, based on a media program that is currently being viewed, based on a media program that is scheduled to be viewed at a later time (e.g., a media program that has been recorded for later playback by a DVR, is scheduled to be recorded by a DVR, has been downloaded from a media download service or store, has been identified for streaming to a computing or media device of the user, etc.), or in some other manner. In some illustrative implementations, the user device may transmit an identification of the media program instead of or in addition to an actual timeframe.

In some illustrative implementations, the user device may also determine one or more parameters (e.g., predetermined and/or user-selected) for use in identifying desired messages (310). The parameters may include, for example, an identification of the messaging services to be included in the message search, an identification of users who posted the desired messages (e.g., by legal name, username, and/or another type of identifier), search terms (e.g., keywords, hashtags, and/or other content identifiers) to be used in narrowing the identified messages, etc. The user device may be configured to generate a request (e.g., including the time range, media program identification, and/or other parameters) and transmit the request to the server system (315).

The server system may be configured to determine appropriate messages based on the information provided in the request (e.g., the time range, media program identification, and/or other parameters) and transmit the messages to be received at the user or client device (320). The user device may be configured to correlate the posting times of the messages (e.g., as embodied within timestamps for the messages) with times within a broadcast timeframe of a media program (325). In some illustrative implementations, the correlation may be performed by the server system, and correlation data representing the time relationship between the messages and media program and/or timeframe referenced in the request may be transmitted from the server system to the user device.

The user device may be configured to generate display data representing the media program and/or messages and transmit the display data to one or more display devices (330). In some illustrative implementations, the user device may be configured to generate display data relating to only the message data and may be configured to monitor the playback of the media program and correlate the display of the messages to the media program. For example, in one illustrative implementation, a separate set top box (e.g., a Google TV device) may be used to provide the message data than that used to provide media programs (e.g., a separate DVR device), and the separate set top box may be configured to monitor the playback on the media programs on the DVR device and display messages at appropriate times within the playback timeframe according to the correlation between the messages and the media programs.

The display devices may be configured to display the messages represented in the display data in response to receiving the display data (335). Each message may be displayed at a time during the playback time range of the media program that corresponds to a relative time position between the original post time of the message and the broadcast time range for the media program.

Figure 4:
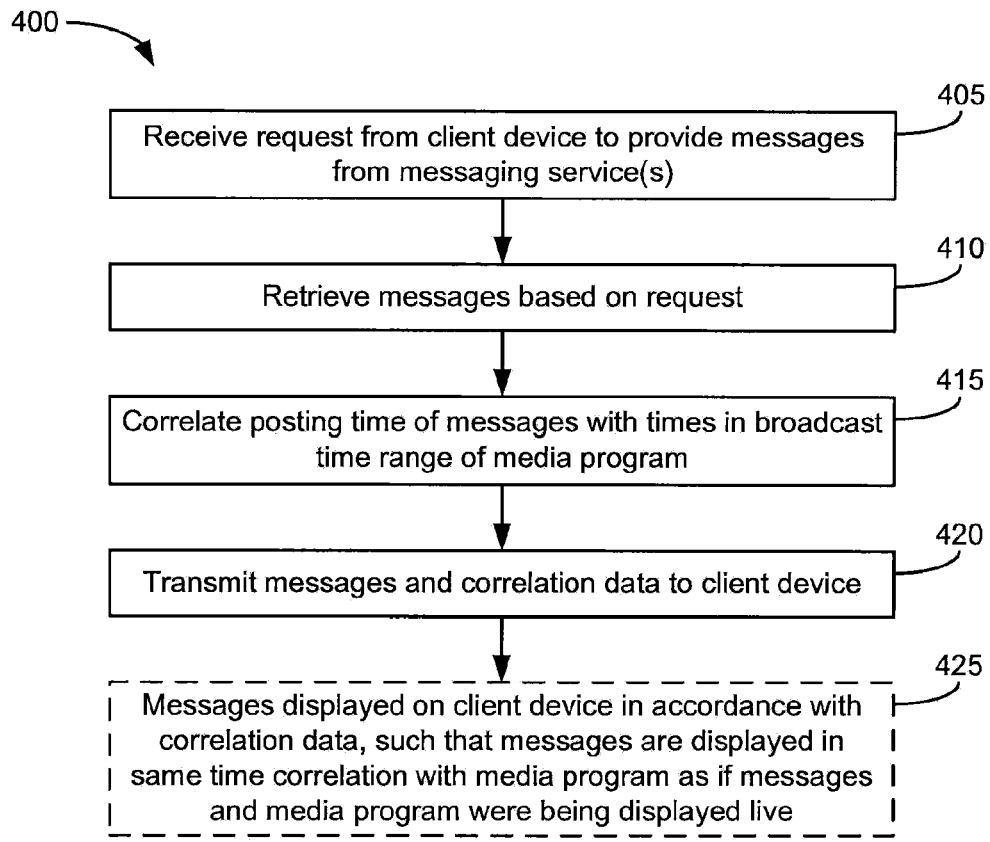
FIG. 4 is a flow diagram of a process for providing messages that are correlated with a timeshifted media program in which correlation data is generated at a server system according to an illustrative implementation.

Referring now to FIG. 4, a flow diagram of a process 400 for providing messages that are correlated with a timeshifted media program in which correlation data is generated at a server system is shown according to an illustrative implementation. In some illustrative implementations, various steps of process 400 may be carried out or executed using a server system (e.g., content management system 108).

The server system may be configured to receive requests from user devices to retrieve message data and provide the message data to the user devices (405). The request may include various parameters to be used in searching the message data, such as relevant timeframe, identification of a media program, identification of messaging services and/or users of the messaging services, search terms, etc.

The server system may be configured to retrieve messages based on the request (410). In some illustrative implementations, historical message data for one or more message services may be requested by the server system from the message services. In some illustrative implementations, historical message data may additionally or alternatively be stored in a database of message data. For example, in one illustrative implementation, historical message data representing messages stored on messaging services (e.g., social media networks, such as Google+, Buzz, Twitter, Facebook, etc.) may be retrieved from a Google Realtime server and/or database. In some illustrative implementations, the messages as archived may be associated with various search parameters, such as posting time, the user who posted the message, the messaging service on which the message was posted, one or more subjects associated with the message, one or more keywords or hashtags associated with the message, etc.

Once the messages have been identified, the server system may be configured to correlate the posting times of the messages with times within the time range associated with the request (415). In some illustrative implementations (e.g., if an identification of a media program is provided in the request instead of a timeframe), the server system may be configured to correlate the posting times of the messages with times within the broadcast time of the media program. The server may be configured to generate correlation data representing the time relationship between the posting time of the messages and the request timeframe and/or the broadcast timeframe of the media program. The messages and correlation data may be transmitted to the user or client device (420). In some illustrative implementations, the correlation may be performed by the client device(s), and the server computer may be configured to transmit the message data without providing correlation data. The messages may be displayed on the client device(s) in accordance with the correlation data, such that the messages are displayed at approximately the same time within a playback timeframe of the media program as if the messages and media program were being viewed live as they were posted and broadcast/distributed (425).

Figure 5:
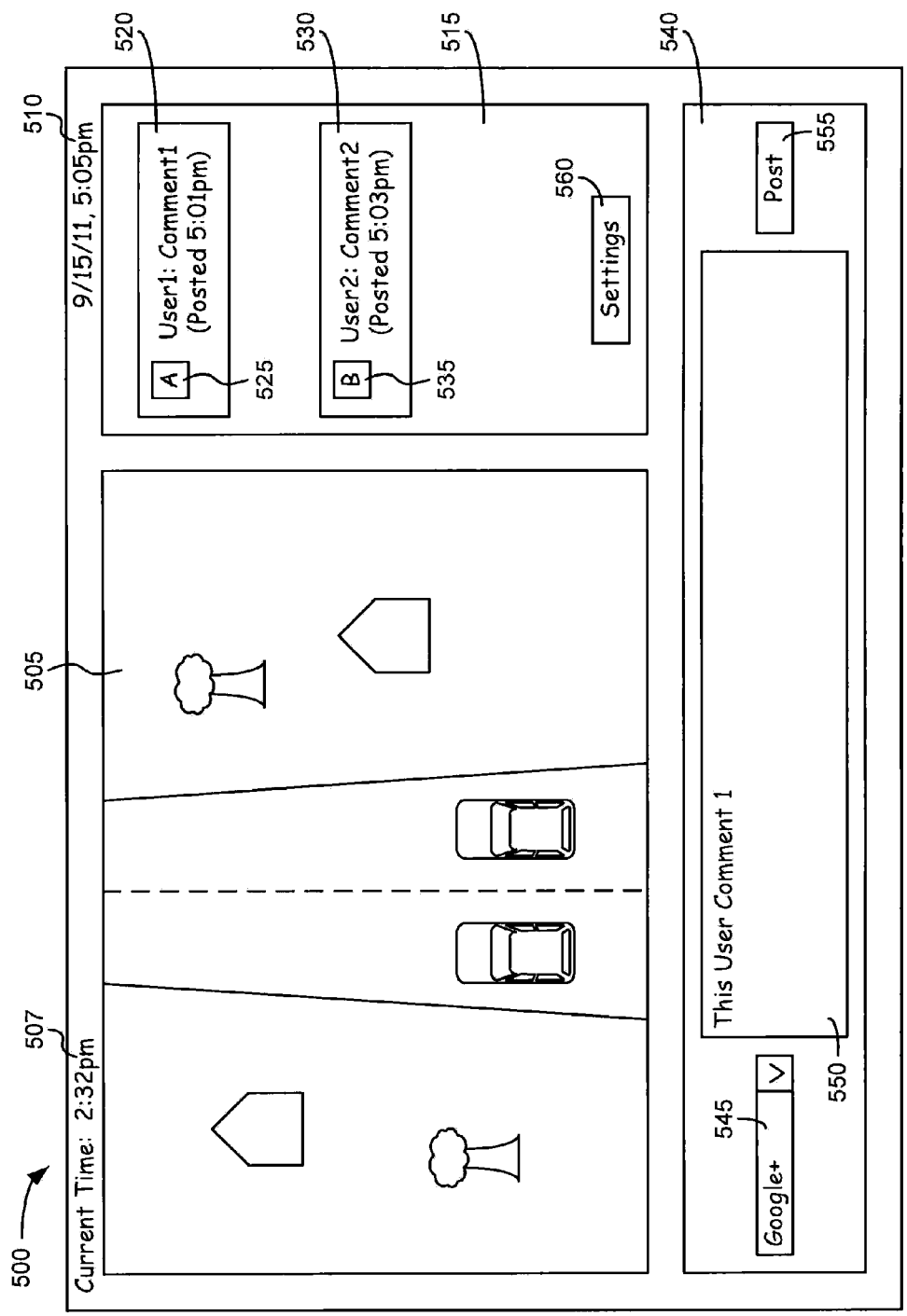
FIG. 5 is an example display image that may be used to display a media program and one or more messages according to an illustrative implementation.

Referring now to FIG. 5, an example display image 500 that may be used to display a media program and one or more messages is shown according to an illustrative implementation. Display image 500 is one example display image that may be used to provide media programming and message data to a user in an illustrative implementation; in other implementations, various elements may be added, removed, moved, etc. in the display images provided to the user.

Display image 500 includes a media program frame 505 that is configured to display a media program. The media program may be viewed by a user after it has been broadcast in a timeshifted manner. In some illustrative implementations, a current time 507 and/or a playback time 510 (e.g., a broadcast start time of the current media program being played, a broadcast current time associated with the current position of the media program, a current position within a playback timeline, etc.) may be provided in display image 500. In the illustrated example, playback time 510 represents a broadcast time of the media program associated with the current position in the playback of the program.

Display image 500 also includes a message frame 515 that is configured to display messages that have been posted on messaging services. In the illustrated example display image 500, two messages have been displayed. The first message 520 is a message posted by User1, having the content "Comment1," and originally posted at 5:01 PM on the day of the media program broadcast on messaging service A. The messaging service on which the message was posted may be indicated by a messaging service indicator 525 (e.g., a logo, name, etc. associated with the messaging service). The second message 530 was posted at 5:03 PM by User2 on messaging service B. Both messages appear in message frame 515 because the current position in the playback timeframe corresponds with 5:05 PM in the broadcast timeframe (e.g., the current position is the five minute mark of the playback timeframe, assuming the start of the broadcast was 5 PM) and each of the messages was posted before 5:05 PM.

In some illustrative implementations, display image 500 may include a message posting frame 540 that may be used to post messages to the messaging services. Although a user may be viewing the media program after the broadcast time, the user may still wish to share his thoughts on the media program via a messaging service. The user may choose a messaging service from a menu 545 and type the desired message into a message field 550. The user may then post the message to the service by selecting post button 555. In some illustrative implementations, additional posting tools may be provided, such as the ability to post photos, videos, links, etc.

In some illustrative implementations, one or more playback controls may be provided in display 500 and may be activated by a user via a user input device (e.g., touchscreen, remote, etc.). Some example playback controls may include play, pause, rewind, fast forward, skip ahead, skip back, etc.

In some illustrative implementations, an option may be provided to the user to change various settings or parameters used to determine the messages that appear in message frame 515. Clicking settings button 555 may open a settings dialog screen in which the user can specify and/or change various settings. Further details regarding the settings dialog screen, according to one illustrative implementation, are provided with respect to FIG. 7.

Figure 6:
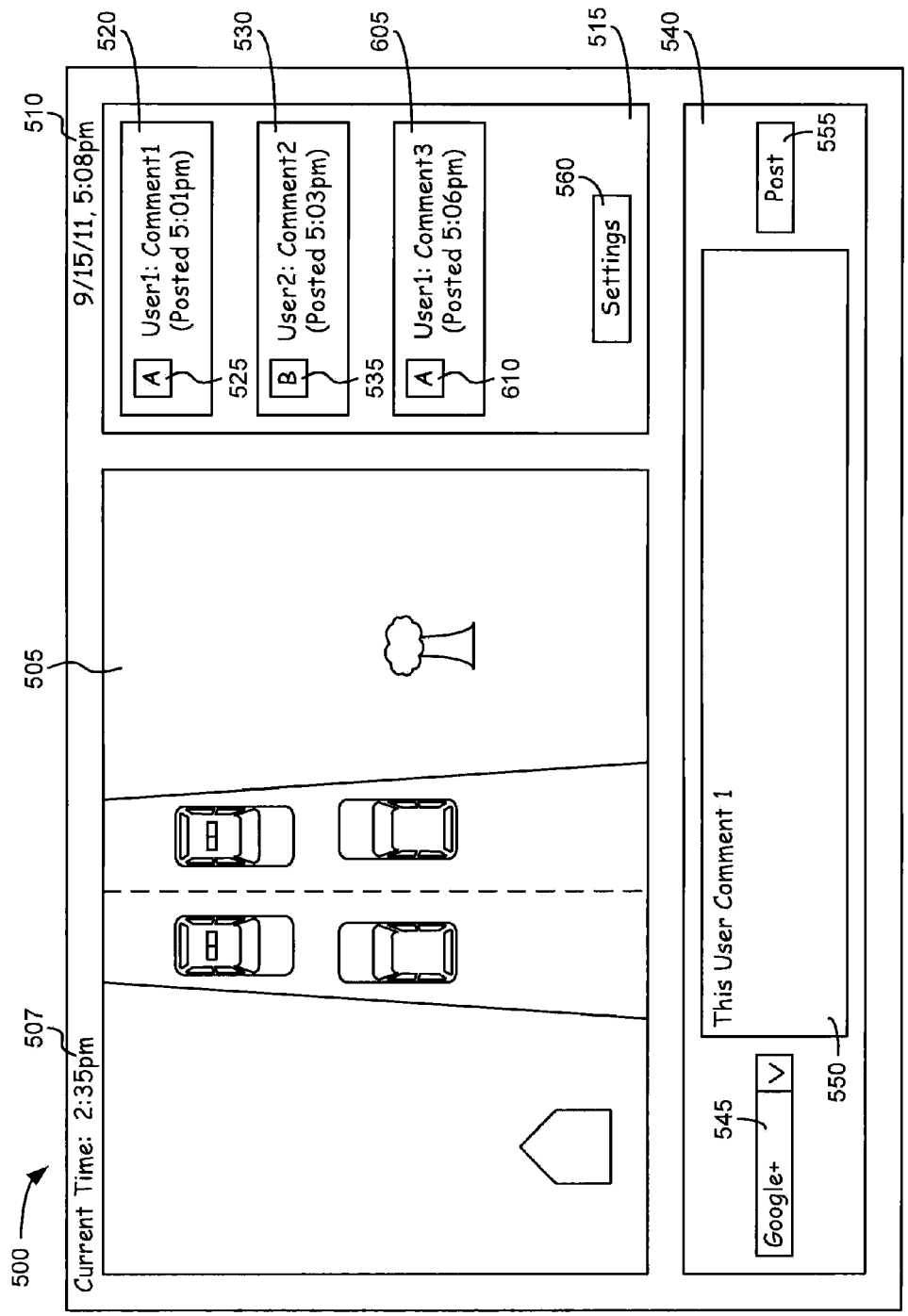
FIG. 6 is another example display image that may be displayed at a time later than the display image shown in FIG. 5 according to an illustrative implementation.

Referring now to FIG. 6, another example display image 600 that may be displayed at a time later than the display image shown in FIG. 5 is shown according to an illustrative implementation. Display image 600 represents a display image that may appear once the playback time has advanced to a time corresponding to a broadcast time of the media program of 5:08 PM. A third message 605 has been provided in message frame 515 that was posted by User1 on messaging service A at 5:06 PM. In the illustrated example, the message may have appeared in message frame 515 once the playback time of the media program reached a position corresponding to a broadcast time of 5:06 PM.

Referring now to FIG. 7, an example display image 700 that may be used to set various message parameters is shown according to an illustrative implementation. Timeframe parameters 705 may enable a user to provide a timeframe for the messages that the user wishes to be displayed or specify that the timeframe should be that associated with the program being viewed. In some illustrative implementations, the user may identify other programs (e.g., other saved programs, programs identified to be saved and/or viewed later, programs identified manually by the user, etc.) which should be used to determine the desired timeframe for messages.

Messaging service parameters 710 may enable a user to specify the messaging services or networks that are active and from which messages may be retrieved. In the illustrated implementation, the user may select one or more of the listed networks (e.g., by clicking the checkboxes next to the networks) and identify other available networks using the "Other" checkbox.

Contact import tool 715 may allow a user to import contacts from a messaging service of which they are a member or user. The user may identify the desired messaging service, and the user's contacts may appear in a list. The user may select which contacts the user wishes to add to the list of users that may be used to limit the displayed messages. In some illustrative implementations, the user may choose to add all contacts to the list. Contact import tool 715 may import contacts using authentication information (e.g., usernames and passwords for each messaging service) for the user that may be entered using a network setup tool 720.

Message parameters 725 may be used to limit the messages that are retrieve and/or displayed based on various additional parameters. For example, a user may be enabled to select which messaging services the messages should have been posted on using network parameter 730, which users posted the desired messages using user parameter 735, and/or keywords or other search terms that should be used to limit the retrieved and displayed messages using search term parameters 740. In some illustrative implementations, a user may be enabled to manually provide one or more terms that should be used to limit the messages using manual search term parameters 750 and/or indicate that the system should automatically limit the resultant messages based on terms identified as associated with the media program being viewed using automatic search term parameter 745.

In some illustrative implementations, a user may be enable to suppress message alerts associated with one or more messaging services using a suppression tool 755. The user may receive message alerts when contacts of the user post messages on messaging services to which the user belongs. In some instances, the messages may relate to media programming that the user intends to watch in a timeshifted fashion and for which the user does not wish to receive information that may spoil surprises in the media program (e.g., the outcome of a sporting event).

Suppression tool 755 may be used to block or suppress alerts relating to certain messages posted on one or more messaging services. For example, a user may receive Google+ message alerts for a group of contacts through an application on the user's smartphone. In some illustrative implementations, a user may indicate that the user wishes to block messages from a particular contact because the user knows that contact watched the media program that the user wishes to watch later via timeshifting, and suppression tool 755 communicates with the messaging service to request that the message service suppress alerts from the user. After the media program has been viewed by the user, the suppression tool 755 may indicate to the messaging service that alerts can be reactivated. In another illustrative implementation, suppression tool 755 may work in conjunction with a program on the same or another device (e.g., a messaging client application, a plug-in or companion application to the messaging application, etc.) to suppress alerts that the program may generate for certain messages the user wishes to suppress. In various illustrative implementations, suppression tool 755 may allow a user to identify messages that should be suppressed by messaging service, user, search terms, and/or any other type of limiting information.

Figure 8:
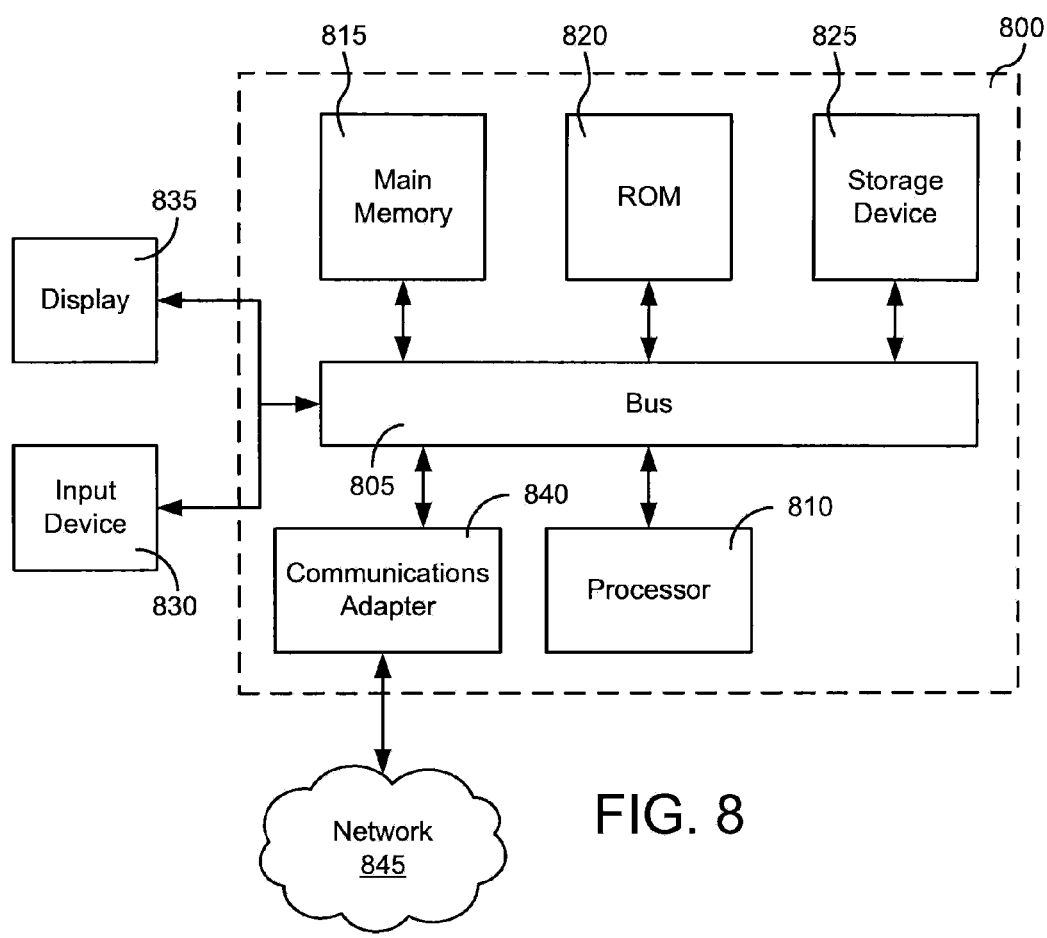
FIG. 8 is a block diagram of a computing system according to an illustrative implementation.

FIG. 8 illustrates a depiction of a computer system 800 that can be used, for example, to implement an illustrative user device 104, an illustrative content management system 108, an illustrative content archiving system 112, and/or various other illustrative systems that may be used in the provision of messages to a user in a timeshifted fashion. The computing system 800 includes a bus 805 or other communication component for communicating information and a processor 810 coupled to the bus 805 for processing information. The computing system 800 also includes main memory 815, such as a random access memory (RAM) or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a read only memory (ROM) 810 or other static storage device coupled to the bus 805 for storing static information and instructions for the processor 810. A storage device 825, such as a solid state device, magnetic disk or optical disk, is coupled to the bus 805 for persistently storing information and instructions.

The computing system 800 may be coupled via the bus 805 to a display 835, such as a liquid crystal display, or active matrix display, for displaying information to a user. An input device 830, such as a keyboard including alphanumeric and other keys, may be coupled to the bus 805 for communicating information, and command selections to the processor 810. In another implementation, the input device 830 has a touch screen display 835. The input device 830 can include a cursor control, such as a mouse, a trackball, or cursor direction keys, for communicating direction information and command selections to the processor 810 and for controlling cursor movement on the display 835.

In some implementations, the computing system 800 may include a communications adapter 840, such as a networking adapter. Communications adapter 840 may be coupled to bus 805 and may be configured to enable communications with a computing or communications network 845 and/or other computing systems. In various illustrative implementations, any type of networking configuration may be achieved using communications adapter 840, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. In alternative implementations, hard-wired circuitry may be used in place of or in combination with software instructions to implement illustrative implementations. Thus, implementations are not limited to any specific combination of hardware circuitry and software.

Although an example processing system has been described in FIG. 8, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination in a single implementation. Conversely, various features that are described in the context of a single implementation can also be carried out in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   transmitting a request to a server to provide a plurality of messages, the request comprising a specified time range during which a media program was broadcast and an identification of one or more messaging services from which to retrieve the plurality messages, each message of the plurality of messages having an associated timestamp within the time range, a first message of the plurality of messages associated with a first contact of a list of contacts and a second message of the plurality of messages associated with a second contact of the list of contacts, the list of contacts determined based on user authentication information;
   receiving the plurality of messages from the server;
   correlating, for each message of the plurality messages, a time at which the each message was originally posted with a time in the specified time range of the request during which the media program was broadcast based on the timestamp of the each message;
   receiving a playback command to display the plurality of messages to a user; and
   displaying the first message associated with the first contact at a first playback time and the second message associated with the second contact at a second playback time,
   wherein the media program and the messages are shifted by approximately the same amount of time from a broadcast time of the media program and times at which the messages were originally posted, respectively, such that the messages are displayed in substantially the same manner as if the media program and messages had been viewed live when they were broadcast and posted.

2. The method of claim 1, wherein the request further comprises an identification of the media program, each message of the plurality of messages is determined based on search parameters specific to the media program.

3. The method of claim 1, further comprising:
   transmitting data to a first display device causing the first display device to display the media program in response to the received playback command, and
   wherein the displaying of the first message and the second message comprises transmitting data to a second display device causing the second display device to display the first message and the second message.

4. The method of claim 3, wherein the first display device is a DVR device.

5. The method of claim 1, wherein the time range of the request is based on a start time received from a user input device.

6. The method of claim 1, wherein the request further comprises one or more user-specified parameters.

7. The method of claim 6, wherein the one or more user-specified parameters comprise an identification of the first contact and the second contact of the list of contacts.

8. The method of claim 6, wherein the one or more user-specified parameters comprise one or more search terms to be used by the server to determine the messages.

9. The method of claim 8, wherein the one or more search terms includes a hashtag.

10. The method of claim 1, further comprising:
    transmitting a suppression request to at least one of a messaging service or a client application for the messaging service operating on a user device, wherein the suppression request comprises a request to suppress alerts relating to one or more messages posted on the messaging service.

11. An apparatus comprising:
    a computing device operably coupled to a memory and configured to:
      transmit a request to a server to provide a plurality of messages, the request comprising a specified time range during which a media program was broadcast and an identification of one or more messaging services from which to retrieve the plurality messages, each message of the plurality of messages having an associated timestamp within the time range, a first message of the plurality of messages associated with a first contact of a list of contacts and a second message of the plurality of messages associated with a second contact of the list of contacts, the list of contacts determined based on user authentication;
      receive the plurality of messages from the server;
      correlate, for each message of the plurality messages, a time at which the each message was originally posted with a time in the specified time range of the request during which the media program was broadcast based on the timestamp of the each message;
      receive a playback command to display the plurality of messages to a user; and
      display the first message associated with the first contact at a first playback time and the second message associated with the second contact at a second playback time,
      wherein the media program and the messages are shifted by approximately the same amount of time from a broadcast time of the media program and times at which the messages were originally posted, respectively, such that the messages are displayed in substantially the same manner as if the media program and messages had been viewed live when they were broadcast and posted.

12. The apparatus of claim 11, wherein the request further comprises one or more user-specified parameters.

13. The apparatus of claim 12, wherein the one or more user-specified parameters comprise an identification of the first contact and the second contact of the list of contacts.

14. The apparatus of claim 12, wherein the one or more user-specified parameters comprise one or more search terms to be used by the server to determine the messages.

15. The apparatus of claim 14, wherein the one or more search terms includes a hashtag.

16. The apparatus of claim 11, wherein the request further comprises an identification of the media program, each message of the plurality of messages is determined based on search parameters specific to the media program.

17. The apparatus of claim 11, wherein the computing device operably coupled to the memory is further configured to:
    transmit data to a first display device causing the first display device to display the media program in response to the received playback command, and
    wherein the displaying of the first message and the second message comprises transmitting data to a second display device causing the second display device to display the first message and the second message.

18. The apparatus of claim 17, wherein the first display device is a DVR device.

19. A non-transitory computer-readable medium having instructions stored thereon that, when executed by a processor, cause the processor to perform operations comprising:

transmitting a request to a server to provide a plurality of messages, the request comprising a specified time range during which a media program was broadcast and an identification of one or more messaging services from which to retrieve the plurality messages, each message of the plurality of messages having an associated timestamp within the time range, a first message of the plurality of messages associated with a first contact of a list of contacts and a second message of the plurality of messages associated with a second contact of the list of contacts, the list of contacts determined based on user authentication information;

receiving the plurality of messages from the server;

correlating, for each message of the plurality messages, a time at which the each message was originally posted with a time in the specified time range of the request during which the media program was broadcast based on the timestamp of the each message;

receiving a playback command to display the plurality of messages to a user;

transmitting data to a first display device causing the first display device to display a media program in response to the received playback command; and transmitting data to a second display device causing the second display device to display the first message associated with the first contact at a first playback time and the second message associated with the second contact at a second playback time, wherein the media program and the messages are shifted by approximately the same amount of time from a broadcast time of the media program and times at which the messages were originally posted, respectively, such that the messages are displayed in substantially the same manner as if the media program and messages had been viewed live when they were broadcast and posted.

20. The non-transitory computer-readable medium of claim 19, wherein the request further comprises an identification of the first contact and the second contact of the list of contacts.

21. The non-transitory computer-readable medium of claim 19, wherein the request further comprises one or more search terms to be used by the server to determine the plurality of messages.

22. The non-transitory computer-readable medium of claim 21, wherein the one or more search terms includes a hashtag.

23. The non-transitory computer-readable medium of claim 19, wherein the first display device is a DVR device.

24. The non-transitory computer-readable medium of claim 23, wherein the second display device is set top box.

\* \* \* \* \*